(12) United States Patent
Chakraborty et al.

(10) Patent No.: US 11,963,042 B1
(45) Date of Patent: Apr. 16, 2024

(54) SYSTEM AND METHOD FOR OFFLOADING TRAFFIC FROM A CELLULAR NETWORK TO A BROADCAST NETWORK

(71) Applicant: Saankhya Labs Pvt. Ltd., Bangalore (IN)

(72) Inventors: Arindam Chakraborty, Ghaziabad (IN); Makarand Kulkarni, Bangalore (IN); Anindya Saha, Bangalore (IN); Gururaj Padaki, Bangalore (IN); Parag Naik, Bangalore (IN); Preetham Uthaiah, Bangalore (IN)

(73) Assignee: SAANKHYA LABS PVT. LTD., Bangalore (IN)

( * ) Notice: Subject to any disclaimer, the term of this patent is extended or adjusted under 35 U.S.C. 154(b) by 0 days.

(21) Appl. No.: 17/767,407

(22) PCT Filed: Mar. 18, 2021

(86) PCT No.: PCT/IN2021/050278
§ 371 (c)(1),
(2) Date: Apr. 7, 2022

(87) PCT Pub. No.: WO2021/186474
PCT Pub. Date: Sep. 23, 2021

(30) Foreign Application Priority Data

Mar. 18, 2020 (IN) .............................. 202041011782

(51) Int. Cl.
*H04W 28/02* (2009.01)
*H04W 24/02* (2009.01)
*H04W 28/08* (2023.01)
*H04W 36/22* (2009.01)

(52) U.S. Cl.
CPC .............................. *H04W 28/0867* (2020.05)

(58) Field of Classification Search
CPC ... H04W 24/08; H04W 4/06; H04W 28/0867; H04W 28/0925; H04W 28/086; H04W 28/0831; H04W 36/22
See application file for complete search history.

(56) References Cited

U.S. PATENT DOCUMENTS

| 10,243,841 | B2 * | 3/2019 | Gupta | ..................... H04L 45/16 |
| 10,904,791 | B2 * | 1/2021 | Naik | ..................... H04W 36/22 |
| 11,259,209 | B2 * | 2/2022 | Naik | ................. H04W 28/0289 |

(Continued)

FOREIGN PATENT DOCUMENTS

WO  WO-2017084485 A1 * 5/2017 .............. H04W 4/06

*Primary Examiner* — Ahmed Elallam

(57) ABSTRACT

A system for offloading traffic from a cellular network to a broadcast network is provided. The offloading mechanism caters to both unicast and broadcast traffic. The system includes a converged cellular core network, World Wide Web, a CDN, a Broadcast Offload Packet Core (BO-PC), a cellular base station, a Broadcast Radio Head, and a converged UE. The converged cellular core network includes an enhanced packet core, a policy rules engine and a packet inspection and steering unit. The BO-PC includes a Broadcast Proxy, a subscriber database, a Broadcast Offload Service Center, a Broadcast Offload Gateway and an analytics engine. For offloading the unicast traffic, the packet inspection and steering unit identifies sessions that are offloaded for supporting offload of the traffic from the converged cellular core network to the broadcast network.

11 Claims, 8 Drawing Sheets

(56) References Cited

U.S. PATENT DOCUMENTS

| | | | | |
|---|---|---|---|---|
| 11,444,725 | B2* | 9/2022 | Ilsen | H04W 4/06 |
| 2014/0341109 | A1* | 11/2014 | Cartmell | H04W 28/0263 |
| | | | | 370/328 |
| 2019/0379551 | A1* | 12/2019 | Prasad | H04L 12/189 |
| 2020/0389469 | A1* | 12/2020 | Litichever | H04W 4/40 |
| 2022/0351245 | A1* | 11/2022 | Hardin | H04W 4/02 |

* cited by examiner

SYSTEM AND METHOD FOR OFFLOADING TRAFFIC FROM A CELLULAR NETWORK TO A BROADCAST NETWORK

CROSS-REFERENCE TO RELATED APPLICATIONS

This application claims priority to Indian non-provisional patent application no. 201841034480 filed on Sep. 12, 2018, and the Indian provisional patent application no. 202041011782 filed on Mar. 18, 2020, the complete disclosures of which, in their entireties, is herein incorporated by reference.

BACKGROUND

Technical Field

The embodiments herein generally relate to a cellular network and a broadcast network, and more particularly, to a system and method for offloading traffic from the cellular network to the broadcast network.

Description of the Related Art

Mobile data offloading is the use of complementary network technologies for delivering data originally targeted for cellular networks. Offloading reduces the amount of data being carried on the cellular bands, freeing bandwidth for other users. It is also used in situations where local cell reception may be poor, allowing a user to connect via alternate wireless or wired services with better connectivity.

There is an increasing need for offloading solutions due to the explosion of Internet data traffic, especially the growing portion of traffic going through mobile networks. This has been enabled by smartphone devices together with higher resolution screens and different Internet applications, from browsers to video and audio streaming applications. A particular issue is that of the ever-increasing video traffic, which not only requires high bandwidth but also stringent service (QoS) in terms of latency and jitter. Widely viewed content streamed over unicast networks, such as live sports and news events can cause severe congestion in the cellular networks. With the advent of Over the Top (OTT) content, cellular broadband services are facing a major challenge, compounded by the fact that users are moving from conventional televisions to personal mobile devices. Although Wi-Fi is currently the preferred offload mechanism, it is not the best solution for video and high QoS demanding services since the downlink competes with uplink for transmission resources (frequency bands and time slots). Also, maintaining QoS in the Wi-Fi network is more challenging, as compared to a cellular network or a broadcast network. Recognizing the fact that the broadcast network is the best method of providing video download, the 3rd Generation Partnership Project (3GPP) has incorporated "evolved Mobile Broadcast Multicast Service (eMBMS)". This is explained in a published paper titled "Broadcast and Multicast Communication Enablers for the Fifth-Generation of Wireless Systems" on Jun. 29, 2018 (http://5g-xcast.eu/wp-content/uploads/2019/04/5G-Xcast_D3.1_v1.1_web.pdf) where it is reported that the spectral efficiency of Broadcast Standards is superior compared to eMBMS. However, the eMBMS service works only for Linear TV and shares the same spectral resources as the cellular traffic. Hence it does not solve the congestion problem in general, only providing minor relief for very few widely viewed contents.

Accordingly, there remains a need for a system and method for mitigating and/or overcoming drawbacks associated with current systems and methods.

SUMMARY

In view of the foregoing, embodiments herein provide a system for offloading traffic from a cellular network to a broadcast network. The system includes a converged cellular core network that includes a packet inspection and steering unit. The packet inspection and steering unit monitors the traffic between the converged cellular core network and a cellular base station to identify at least one commonly consumed content stream for offloading the traffic. The packet inspection and steering unit determines whether the at least one commonly consumed content stream being consumed over unicast. The packet inspection and steering unit determines whether at least one converged User Equipment (UE) that receives the at least one commonly consumed content stream is in a region that includes adequate coverage area and adequate spare capacity exists in a broadcast pipe in a unidirectional downlink network for offloading broadcast traffic if the at least one commonly consumed content stream being consumed over the unicast. The packet inspection and steering unit offloads the broadcast traffic from the cellular network to the broadcast network over the unidirectional downlink network based on an offload signal that is received from an analytics engine.

In some embodiments, the analytics engine indicates the packet inspection and steering unit to offload the at least one commonly consumed content stream as a broadcast payload in the unidirectional downlink network by (i) determining if there is the adequate coverage area and the adequate spare capacity in the region of interest in the unidirectional downlink network and (ii) determining if a number of UEs are consuming the at least one commonly consumed content stream within the adequate coverage area and the adequate spare capacity in the region of interest.

In some embodiments, the packet inspection and steering unit offloads a downlink part of unicast traffic to the unidirectional downlink network as a supplementary downlink service if the analytics engine determines that the number of UEs does not receive the at least one commonly consumed content stream.

In some embodiments, the packet inspection and steering unit shifts the traffic back to the cellular network from the broadcast network, if the analytics engine determines that the adequate coverage area or the adequate spare capacity are not available for the unidirectional downlink network.

In some embodiments, the packet inspection and steering unit offloads the broadcast traffic from the cellular network to the broadcast network or the downlink part of the unicast traffic to the unidirectional downlink network as the supplementary downlink service based on rules that are stored in a Policy Rules Engine. In some embodiments, the Policy Rules Engine is implemented with the packet inspection and steering unit.

In some embodiments, the system includes a Broadcast Offload Packet Core (BO-PC) that includes a Broadcast Proxy, a Subscriber (SUBS) database, a Broadcast/Offload Service Center (BO-SC), a Broadcast/Offload Gateway (BO-GW), and the analytics engine.

In some embodiments, the Broadcast Offload Packet Core (BO-PC) interfaces with a Gateway Mobile Location Centre (GMLC) to obtain location information of the at least one converged UE to provide a handoff mechanism when the unidirectional downlink is used for the unicast traffic.

In some embodiments, the analytics engine is configured to gather traffic flow data from at least one of (i) the converged cellular core network, or (ii) the at least one converged user equipment (UE). In some embodiments, the analytics engine gathers the traffic flow data in the cellular network through at least one of (i) an "Element Management System (EMS)" or (ii) a "Self-Optimizing Network (SON)" and that is reported by the at least one converged user equipment (UE) and a load manager that monitors each traffic flow data through the load manager.

In some embodiments, the Subscriber (SUBS) database includes user information that is determined by a unique identity of the at least one converged user equipment (UE) to extract selected data from the traffic flow data between the converged cellular core network and the at least one converged user equipment (UE).

In some embodiments, the Broadcast Offload Service Center (BO-SC) schedules the traffic flow data to be transmitted over the unidirectional downlink for all BRH under the Broadcast Offload Service Center (BO-SC) control.

In some embodiments, the Broadcast Offload Gateway (BO-GW) is configured to interface to a legacy IP Backhaul network to connect all the Broadcast Radio Heads (BRHs) through a unicast link or a multicast link. In some embodiments, the Broadcast Offload Gateway (BO-GW) tunnels header compressed IP packets over the legacy IP backhaul network destined to a target Broadcast Radio Head (BRH).

In some embodiments, the at least one converged UE comprises a location identifying module that reports a current location on the at least one converged UE. In some embodiments, the at least one converged UE determines the current location based on at least one of (i) cellular cell site information, (ii) Broadcast Radio Head identification indicators, (iii) Global Navigation Satellite System (GNSS) information, and (iv) location information obtained from access points or beacons.

In some embodiments, the system includes a converged RAN that comprises an ORAN based eNB/gNB, wherein the ORAN-based eNB/gNB includes a central unit, a distributed unit, and a radio unit.

In one aspect, a method for offloading traffic from a cellular network to a broadcast network is provided. The method includes (i) monitoring, using a packet inspection and steering unit of a converged cellular core network, the traffic between the converged cellular core network and a cellular base station to identify at least one commonly consumed content stream for offloading the traffic, (ii) determining whether the at least one commonly consumed content stream being consumed over unicast, (iii) determining whether at least one converged User Equipment (UE) that receives the at least one commonly consumed content stream is in a region that comprises adequate coverage area and adequate spare capacity exists in a broadcast pipe in a unidirectional downlink network for offloading broadcast traffic if the at least one commonly consumed content stream being consumed over the unicast and (iv) offloading the broadcast traffic from the cellular network to the broadcast network over the unidirectional downlink network based on an offload signal that is received from an analytics engine.

In some embodiments, the method includes indicating, using the analytics engine, the packet inspection, and steering unit to offload the at least one commonly consumed content stream as a broadcast payload in the unidirectional downlink network by (i) determining if there is adequate coverage area and the adequate spare capacity in the region of interest in the unidirectional downlink network and (ii) determining if a number of UEs are consuming the at least one commonly consumed content stream within the adequate coverage and the adequate spare capacity in the region of interest.

In some embodiments, the method includes offloading, using the packet inspection and steering unit, a downlink part of unicast traffic to the unidirectional downlink network as a supplementary downlink service if the analytics engine determines that the number of UEs does not receive the at least one commonly consumed content stream.

In some embodiments, the method includes shifting, using the packet inspection and steering unit, the traffic back to the cellular network from the broadcast network, if the analytics engine determines that the adequate coverage area or the adequate spare capacity are not available for the unidirectional downlink network.

In some embodiments, the packet inspection and steering unit offloads the broadcast traffic from the cellular network to the broadcast network or the downlink part of the unicast traffic to the unidirectional downlink network as the supplementary downlink service based on rules that are stored in a Policy Rules Engine. In some embodiments, the Policy Rules Engine is implemented with the packet inspection and steering unit.

The system and method enable to offload live OTT and video traffic which is being watched by multiple users from the unicast network to the broadcast network. Since the broadcast network is optimized for a live video and OTT distribution, thereby reducing the overall bandwidth required to transfer the same content. This enables the to decongest the unicast networks and improve spectral efficiency of overall network. The policy rules engine determines which type of traffic should be offloaded from the unicast network to the broadcast network. This, in turn, triggers the packet inspection and steering unit to divert the traffic appropriately.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
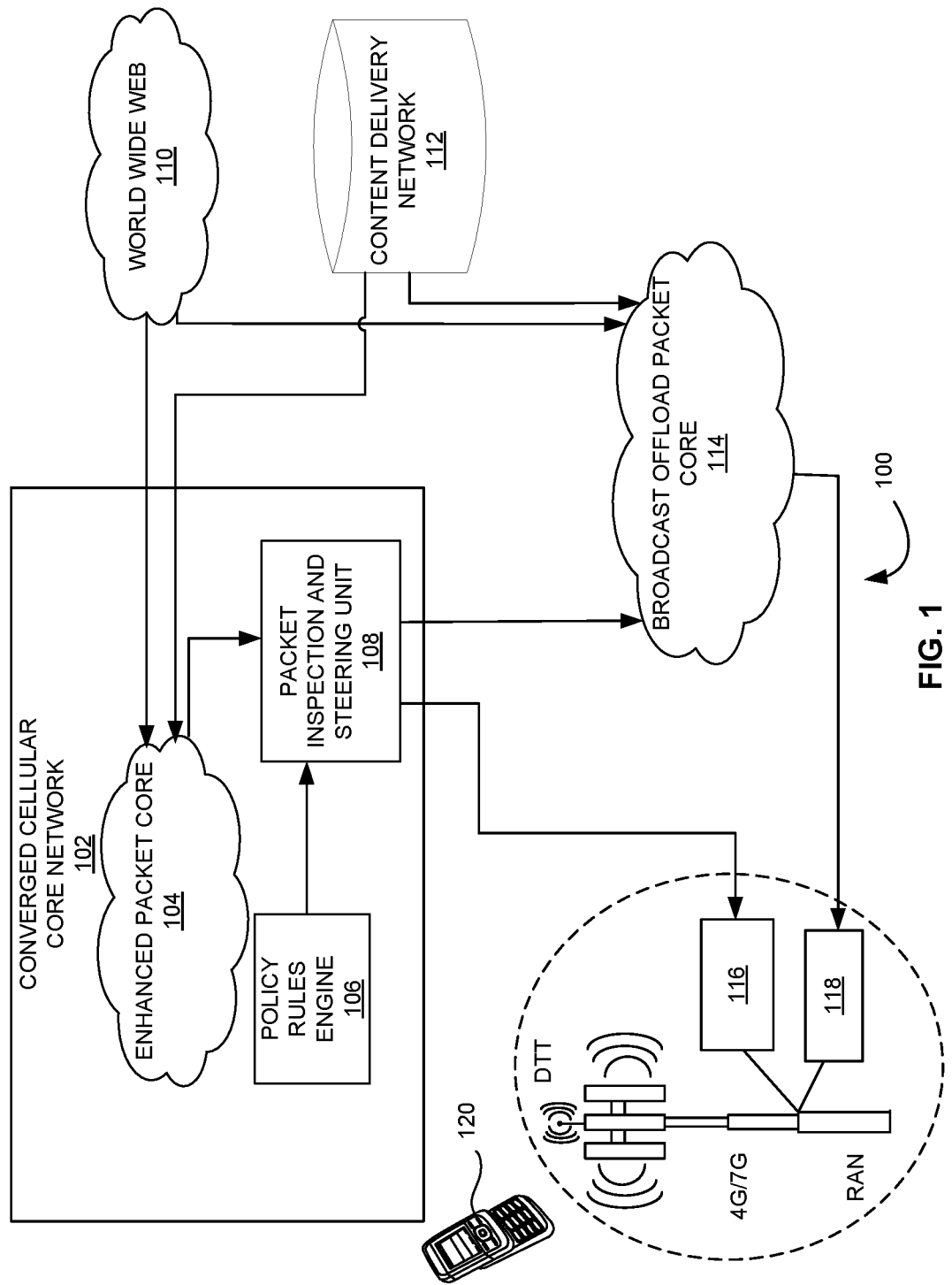
FIG. 1 is a block diagram that illustrates a Broadcast Offload Packet Core (BO-PC) with a packet inspection and steering unit according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for offloading traffic from a cellular network to a broadcast network. Referring now to the drawings, and more particularly to FIGS. 1 through 7, where similar reference characters denote corresponding features consistently throughout the figures, there are shown preferred embodiments.

FIG. 1 is a block diagram 100 that illustrates a Broadcast Offload Packet Core (BO-PC) 114 with a packet inspection and steering unit 108 according to some embodiments herein. The block diagram 100 includes a converged cellular core network 102, world wide web 110, a content delivery network (CDN) 112, the Broadcast Offload Packet Core (BO-PC) 114, a cellular base station (eNodeB) 116, a Broadcast Radio Head (BRH) 118 and a converged user equipment (UE) 120. The converged cellular core network 102 includes an enhanced packet core 104, a policy rules engine 106, and the packet inspection and steering unit 108. The converged cellular core network 102 provides services to at least one of (i) a converged cellular DTT UE or (ii) a converged cellular UE using, the cellular base station 116 and the Broadcast Radio Head (BRH) 118. In some embodiments, the BO-PC 114 serves a very high frequency/ultra-high frequency (VHF/UHF) based "Digital Terrestrial Transmission (DTT)".

The enhanced packet core 104 controls a cellular radio access network (RAN) for providing bidirectional connectivity to the converged user equipment (UE) 120 to transmit or receive data. In some embodiments, the Broadcast offload packet core (BO-PC) 114 controls a broadcast radio access network (RAN). The broadcast radio access network (RAN) includes the Broadcast Radio Head (BRH) 118 for providing a unidirectional downlink path to the converged user equipment (UE) 120 to receive the selected data through the Broadcast Radio Head (BRH) 118. In some embodiments, the Broadcast Offload Packet Core (BO-PC) 114 operates along with a 2G, 3G, a Wi-Fi, 4G, and 5G networks. The converged user equipment (UE) 120 is an enhanced user equipment that is configured to receive commonly consumed content streams from the cellular network and the commonly consumed content streams from the unidirectional downlink path through the Broadcast Offload Packet Core (BO-PC) 114. The Broadcast Radio Head (BRH) 118 is configured to transmit the selected data from the broadcast radio access network (RAN) to the converged user equipment (UE) 120.

The packet inspection and steering unit 108 monitors traffic between the converged cellular core network 102 and the cellular base station 116. In some embodiments, the general packet radio system (GPRS) tunneling protocol (GTP-U) and general packet radio system (GPRS) tunneling protocol (GTP-C) packets are used for tunneling user traffic and corresponding control plane functions respectively. The packet inspection and steering unit 108 determines whether the commonly consumed content streams being consumed over unicast. In some embodiments, the identified commonly consumed content streams may be localized if the cellular base station 116 is identified from the tunneled data and control packets that are monitored by the packet inspection and steering unit 108. In some embodiments, after accommodating all the broadcast traffic, if there is spare capacity in a broadcast pipe, selected unicast traffic in the cellular network is shifted to a unidirectional downlink in a unicast mode of transfer.

To offload the unicast traffic, the packet inspection and steering unit 108 identifies sessions that are offloaded for supporting offload of the traffic from the converged cellular core network 102 to the broadcast network. In some embodiments, downlink offloaded traffic is steered away from the converged cellular core network 102 towards the Broadcast Offload Packet Core (BO-PC) 114. The Broadcast Offload Packet Core (BO-PC) 114 encapsulates the traffic into a format that is compatible with a broadcast standard and communicates the compatible format of the traffic to the BRH 118 to reach the converged UE 120. In some embodiments, a return path comes through a cellular uplink and is merged to an original traffic session in the packet inspection and steering unit 108. The policy rules engine 106 is used by the packet inspection and steering unit 108 to identify one or more user equipment (UEs) and traffic flows corresponding to the one or more user equipment (UEs) for offloading the traffic flows corresponding to the one or more user equipment.

Figure 2:
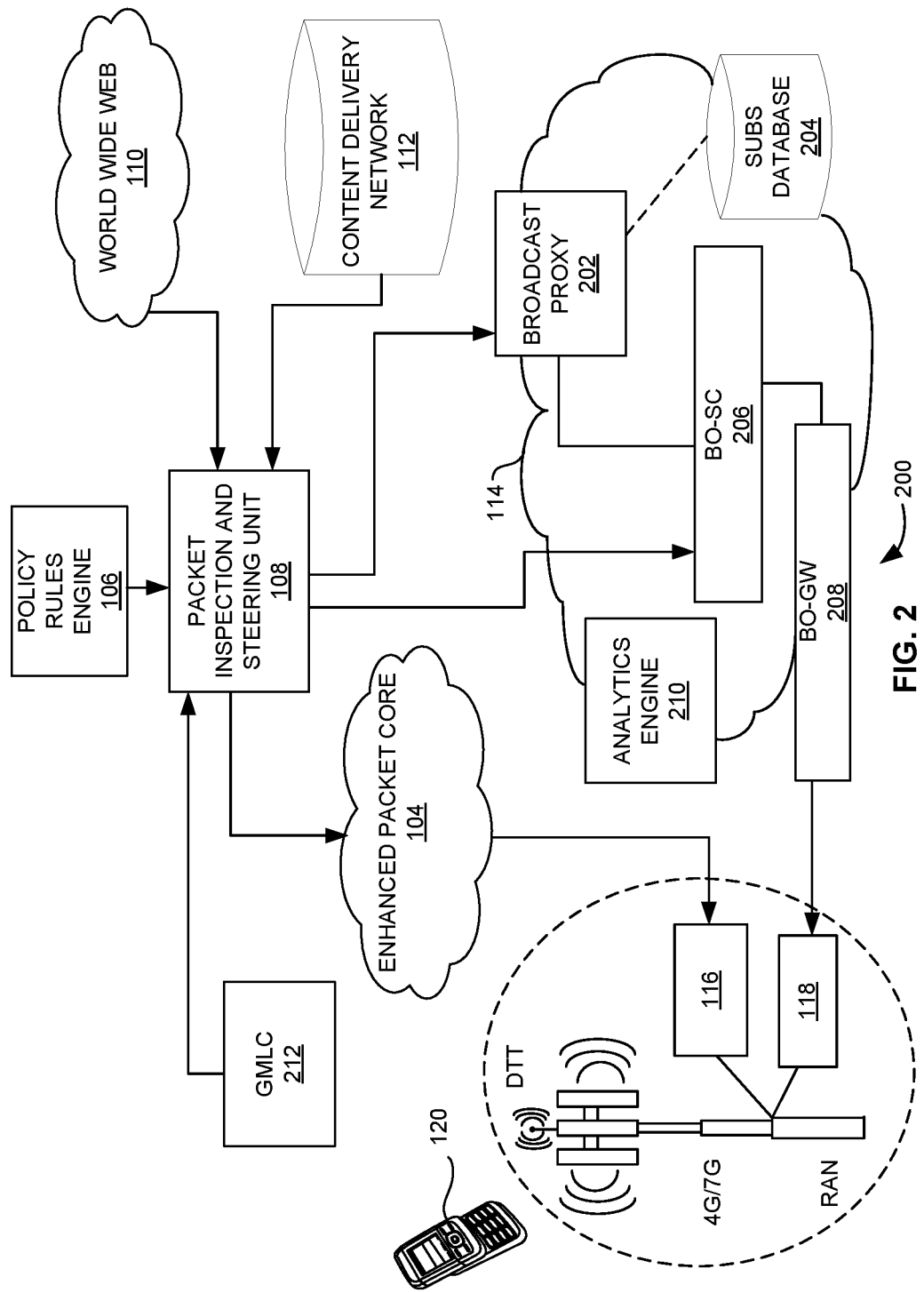
FIG. 2 is a block diagram that illustrates offloading traffic using the packet inspection and steering unit of FIG. 1 according to some embodiments herein.

FIG. 2 is a block diagram 200 that illustrates offloading traffic using the packet inspection and steering unit 108 of FIG. 1 according to some embodiments herein. In some embodiments, the packet inspection and steering unit 108 is positioned between the converged cellular core network 102, such as the enhanced packet core 104, and the worldwide web 110 or the CDN 112. The block diagram 200 includes the converged cellular core network 102, the world wide web 110, the content delivery network (CDN) 112, the Broadcast Offload Packet Core (BO-PC) 114, the cellular base station (eNodeB) 116, the Broadcast Radio Head (BRH) 118 and the converged user equipment 120. The converged cellular core network 102 includes the enhanced packet core 104, the policy rules engine 106, and the packet inspection and steering unit 108.

The Broadcast Offload Packet Core (BO-PC) 114 includes a Broadcast Proxy 202, a Subscriber (SUBS) database 204, a Broadcast/Offload Service Center (BO-SC) 206, a Broadcast/Offload Gateway (BO-GW) 208, and an analytics engine 210. In some embodiments, the 4G network may include control links with a legacy "Gateway Mobile Location Centre (GMLC) 212" and the analytics engine 210, which is a part of the BO-PC 114. The Broadcast Offload Packet Core (BO-PC) 114 interfaces with the legacy Gateway Mobile Location Centre (GMLC) 212 to obtain location information of the converged UE 120 to provide a handoff mechanism when a unidirectional downlink is used for unicast traffic. In some embodiments, the converged UE 120 includes a location identifying the module that reports a current location on the converged UE 120. The converged UE 120 determines the current location based on at least one of (i) cellular cell site information, (ii) Broadcast Radio Head identification indicators, (iii) Global Navigation Satellite System (GNSS) information, and (iv) location information obtained from access points or beacons.

The broadcast proxy 202 initiates broadcast sessions in the Broadcast Offload Packet Core (BO-PC) 114. In some embodiments, the broadcast proxy 202 manages multicasting over the broadcast core network and backhaul networks to reach the BRH. In some embodiments, for unicast traffic offloading, the broadcast proxy 202 function is bypassed, as group communication is not involved.

The Subscriber (SUBS) database 204 includes user information that is determined by a unique identity of the converged user equipment (UE) 120 to extract selected data from the traffic flow data between the converged cellular core network 102 and the converged UE 130. The Broadcast Offload Service Center (BO-SC) 206 schedules the traffic flow to be transmitted over the unidirectional downlink for all BRH under the Broadcast Offload Service Center (BO-SC) control.

In some embodiments, the Broadcast Offload Gateway (BO-GW) 208 is configured to interface to a legacy IP Backhaul network to connect all the Broadcast Radio Heads (BRHs) through a unicast link or multicast links. The Broadcast Offload Gateway (BO-GW) 208 tunnels header compressed IP packets over the legacy IP backhaul network destined to a target Broadcast Radio Head (BRH).

The analytics engine 210 is configured to gather traffic flow data from at least one of (i) the converged cellular core network 102, or (ii) the converged user equipment (UE) 120. In some embodiments, the analytics engine 210 gathers the traffic data in the cellular network through at least one of (i) an "Element Management System (EMS)" or (ii) a "Self-Optimizing Network (SON)" and that reported by the converged UE 120 and a load manager that monitors each traffic flow data through the load manager.

In some embodiments, the analytics engine 210 includes a geographical database that includes latitude and longitude and various radio frequency (RF) parameters, e.g., estimated signal strengths, SINR, capacity utilization based on time of day, etc. The various radio frequency RF parameters include reference signal levels, noise and interference levels, traffic patterns, which quantify coverage and a quality of service of a given location. The geographical database along with a traffic pattern analysis on the traffic flow data determines the traffic flow that is suitable to be sent over the unidirectional downlink. In some embodiments, the analytics engine 210 includes a radio environment database. The radio environment database includes data on a geographical location, latitude, longitude, and various radiofrequency RF parameters. In some embodiments, the various radio frequency RF parameters include reference signal levels, noise and interference levels, traffic patterns, which quantifies coverage and the quality of service at given locations. In some embodiments, the packet inspection and steering unit 108 sends inspection and measurement data that include, but are not limited to session start and end times, websites being visited, packet throughput, packet jitter and latency of acknowledgments, discontinuities (in certain session flows, e.g., RTP), retransmissions, etc. In the case of FIG. 1, the inspected packet headers also provide information on the serving eNodeB location.

The packet inspection and steering unit 108 monitors the traffic between the converged cellular core network 102 and the cellular base station 116 to identify the commonly consumed content streams for offloading the traffic. The packet inspection and steering unit 108 determines whether the commonly consumed content streams being consumed over unicast. The packet inspection and steering unit 108 determines whether the converged User Equipment (UE) 120 receives the commonly consumed content streams are in a region that includes adequate coverage area and adequate spare capacity exists in a broadcast pipe in a unidirectional downlink network for offloading broadcast traffic if the commonly consumed content streams being consumed over the unicast. The packet inspection and steering unit 108 offloads the broadcast traffic from the cellular network to the broadcast network over the unidirectional downlink network based on an offload signal that is received from the analytics engine 210.

In some embodiments, the analytics engine 210 indicates the packet inspection and steering unit 108 to offload the commonly consumed content streams as a broadcast payload in the unidirectional downlink network by (i) determining if there are the adequate coverage area and the adequate spare capacity in the region of interest in the unidirectional downlink network; and determining if a number of UEs are consuming the commonly consumed content streams within the adequate coverage area and the adequate spare capacity in the region of interest.

In some embodiments, the packet inspection and steering unit 108 offloads a downlink part of unicast traffic to the unidirectional downlink network as a supplementary downlink service if the analytics engine 210 determines that the number of UEs does not receive the commonly consumed content streams.

In some embodiments, the packet inspection and steering unit 108 shifts the traffic back to the cellular network from the broadcast network, if the analytics engine 210 determines that the adequate coverage area or the adequate spare capacity are not available for the unidirectional downlink network.

In some embodiments, the packet inspection and steering unit 108 offloads the broadcast traffic from the cellular network to the broadcast network or the downlink part of the unicast traffic to the unidirectional downlink network as the supplementary downlink service based on rules that are stored in the Policy Rules Engine 106. The Policy Rules Engine 106 may be implemented with the packet inspection and steering unit 108.

Figure 3:
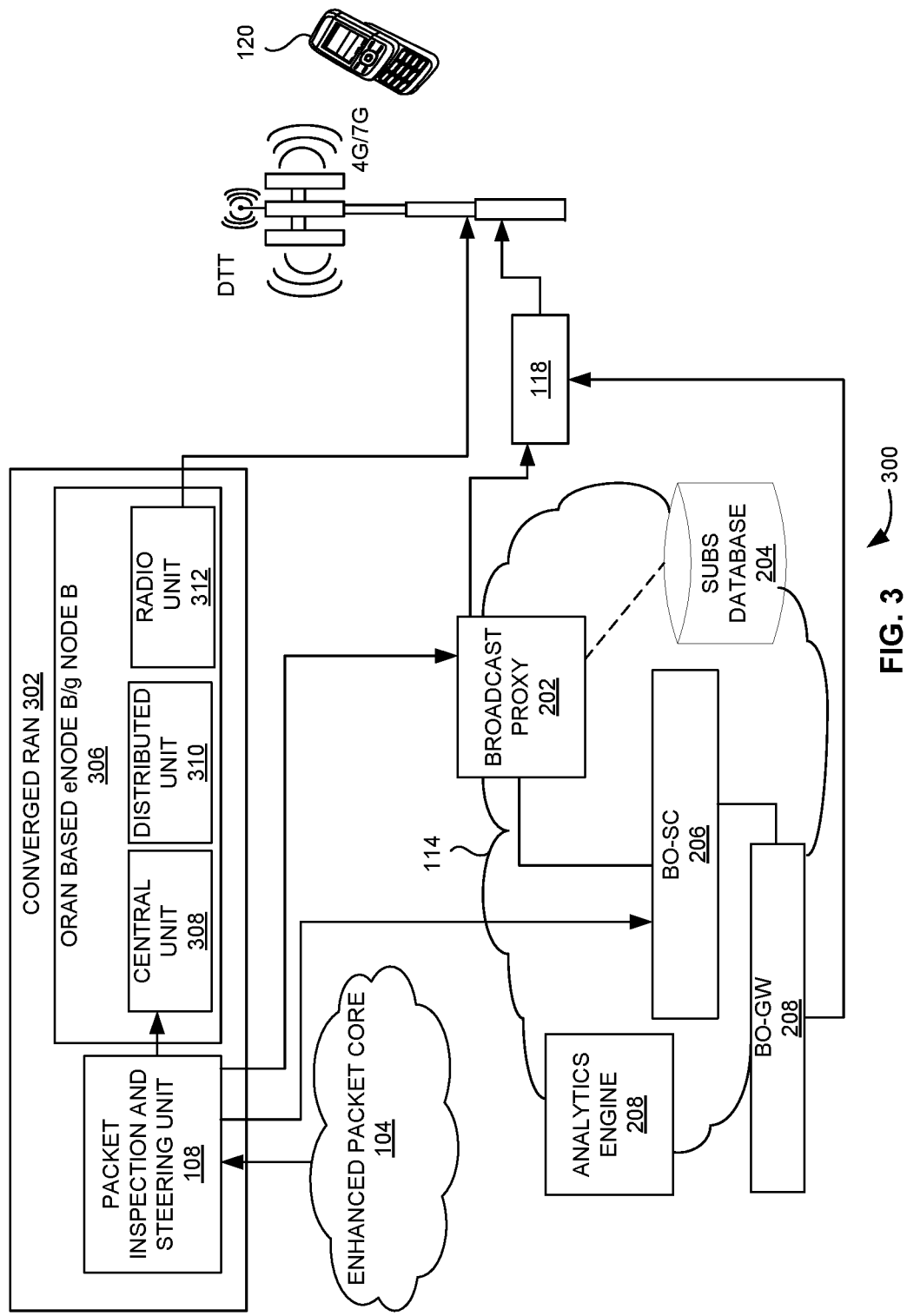
FIG. 3 is a block diagram that illustrates an implementation of an offload mechanism in a scenario where a radio access network (RAN) implementation is distributed according to some embodiments herein.

FIG. 3 is a block diagram 300 that illustrates an implementation of an offload mechanism in a scenario where a radio access network (RAN) implementation is distributed according to some embodiments herein. In some embodiments, the offloading mechanism in the scenario where the RAN implementation is distributed such as an Open RAN (ORAN) framework, which is well described as part of O-RAN alliance standards (https://www.o-ran.org/) and also as part of the 5G NG-RAN Description standard (3GPP TS 38.401). The block diagram 300 includes the enhanced packet core 104, the BO-PC 114, the BRH 118 and the converged user equipment 120 and a converged RAN 302. The converged RAN 302 includes the packet inspection and steering unit 108, an ORAN-based eNB/gNB 306 includes a central unit 308, a distributed unit 310, and a radio unit 312. The central unit 308 is a logical node hosting Radio Resource Control (RRC), Service Data Adaptation Protocol (SDAP), and Packet Data Convergence Protocol (PDCP). The central unit 308 includes a Control Plane and User Plane components. The control Plane of the central unit 308 is a logical node hosting the RRC and the control plane part of the PDCP protocol. The user plane is a logical node hosting the user plane part of the PDCP protocol and the SDAP protocol.

The distributed unit 310 is a logical node hosting RLC/MAC/High-PHY layers based on a lower layer functional split. The radio unit 312 is a logical node hosting Low-PHY layer and RF processing based on the lower layer functional split. This is similar to 3GPP's "TRP" or "RRH" but more specific in including the Low-PHY layer (FFT/iFFT, PRACH extraction).

In some embodiments, the packet inspection and steering unit 108 is integrated with the central unit 308 with a common handler taking care of traffic encapsulation protocol such as GTP running between the converged cellular core network 102 and the converged RAN 302 to obtain improved offload implementation by having joint management of user sessions. The packet inspection and steering unit 108 decides which traffic flows to offload. In some embodiments, if a user of the converged user equipment 120 moves from a coverage area of the ORAN-based eNB/gNB 306 to another coverage area, the enhanced packet core 104 performs a handoff mechanism. The ORAN-based eNB/gNB 306 includes the packet inspection and steering unit 108 that decides which BRH to offload a traffic flow. In some embodiments, an identification of UEs and the traffic flows for offload are notified through the Broadcast Offload Packet Core (BO-PC) 114.

Figure 4:
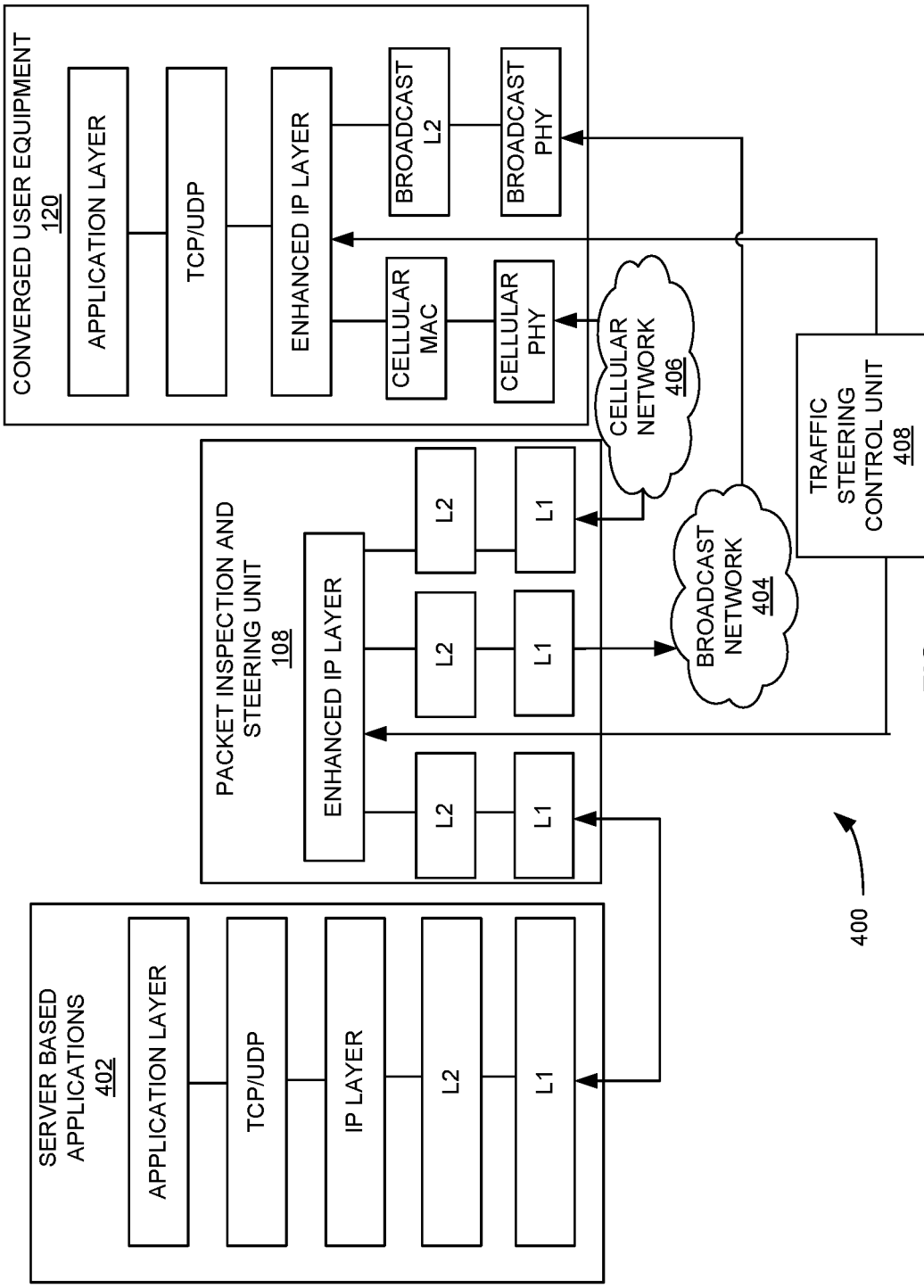
FIG. 4 is a block diagram of an implementation of offload over a unidirectional downlink network, with a cellular network as uplink using a traffic steering control unit based on a topology described in FIG. 2, according to some embodiments herein.

FIG. 4 is a block diagram 400 of an implementation of unicast offload over a unidirectional downlink network, with a cellular network as uplink, using a traffic steering control unit 408, based on the topology described in FIG. 2. according to some embodiments herein. As shown in the block diagram 400 includes server-based applications 402, a broadcast network 404, a cellular network 406, a traffic steering control unit 408, the packet inspection and steering unit 108 and the converged user equipment 120. The server-based applications 402 hosts the content application and is interfaced through a standard protocol stack that includes a transport layer (TCP/UDP), a network (IP Layer), a media access layer (L2), and a physical layer (L1). The packet inspection and steering unit 108 includes an enhanced IP layer, L1 Layers, and L2 Layers. The converged user equipment 120 includes an application layer, TCP/UDP, an enhanced IP Layer, a cellular MAC, a cellular PHY, a Broadcast L2 Layer, and a Broadcast PHY.

In some embodiments, the packet inspection and steering unit 108 is implemented with the Policy Rules Engine 106 to decide traffic flows to be offloaded. The Policy Rules Engine 106 includes rules that are used to identify the traffic that can be offloaded to a unidirectional downlink. In some embodiments, downlink traffic is offloaded and uplink traffic continues to be serviced by the cellular network 406. This requires a modification of the standard protocol stack in the converged UE 120, leading to a requirement of the enhanced IP layer.

The packet inspection and steering unit 108 steers the traffic away from the cellular RAN to the Broadcast Offload Packet Core (BO-PC) 114 on the downlink. In some embodiments, the traffic reaches the converged UE 120. The uplink traffic from the converged UE 120 continues through the cellular network 406. The traffic inspection and steering unit 108 maintains the session integrity as per the requirements of higher-layer protocols. The traffic steering control unit 408 decides and instructs a switchover process at both the network and the terminal end.

Figure 5:
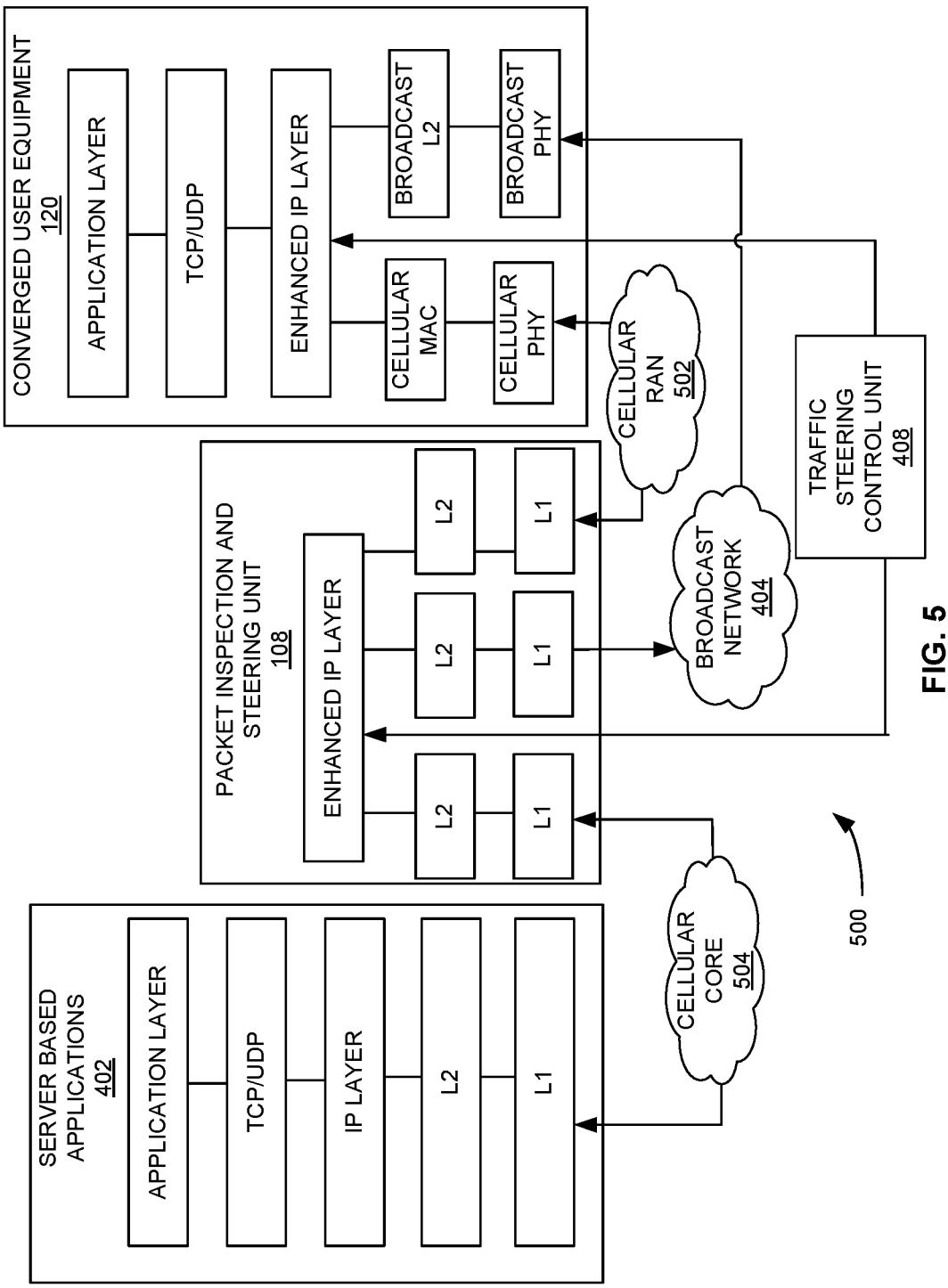
FIG. 5 is a block diagram of an implementation of offload over the unidirectional downlink based on a topology described in FIG. 1 and FIG. 3, with a cellular core as the uplink using the traffic steering control unit according to some embodiments herein.

FIG. 5 is a block diagram 500 of an implementation of unicast offload over a unidirectional downlink network, with a cellular core 504 as an uplink, using the traffic steering control unit 408, based on the topology described in FIG. 1 and FIG. 3 according to some embodiments herein. The block diagram 500 includes the packet inspection and steering unit 108, the converged user equipment 120, the server-based applications 402, the broadcast network 404, the traffic steering control unit 408, a cellular RAN 502, and the cellular core 504. The function of these components has been explained above. The implementation is similar to FIG. 4 except that in this particular case, the packet inspection and steering unit 108 performs its operations on the traffic that has been tunneled using protocols such as GPRS tunneling protocol (GTP). In some embodiments, an outer packet header, such as the GTP packet header is terminated and the tunneled packet extracted and steered to the Broadcast Offload Packet Core (BO-PC) 114.

Figure 6A:
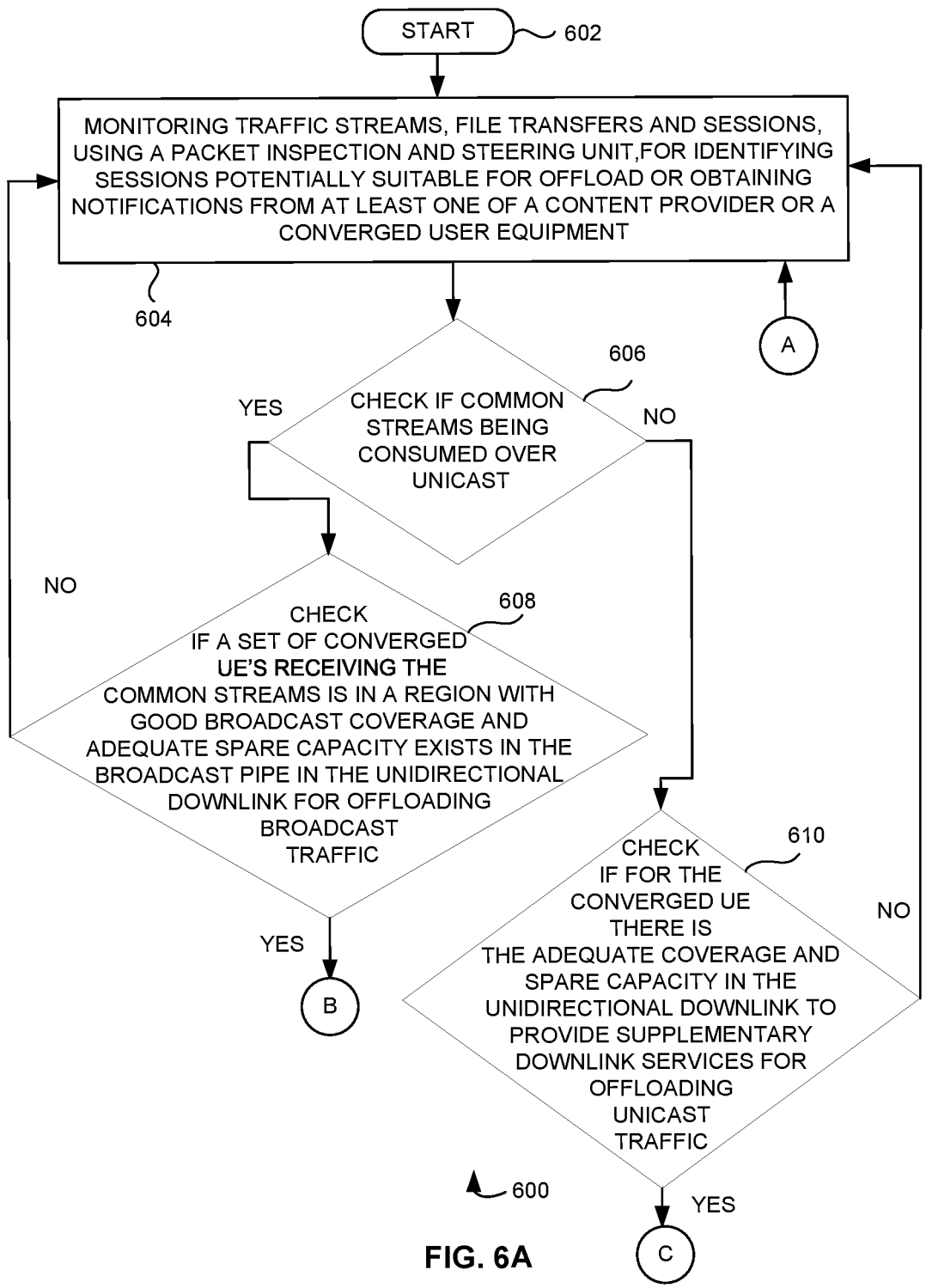
FIGS. 6A-6B are flow diagrams that illustrate a method of offloading at least one of (i) broadcast traffic or (ii) unicast traffic using a packet inspection and steering unit of FIG. 1 according to some embodiments herein.
Figure 6B:
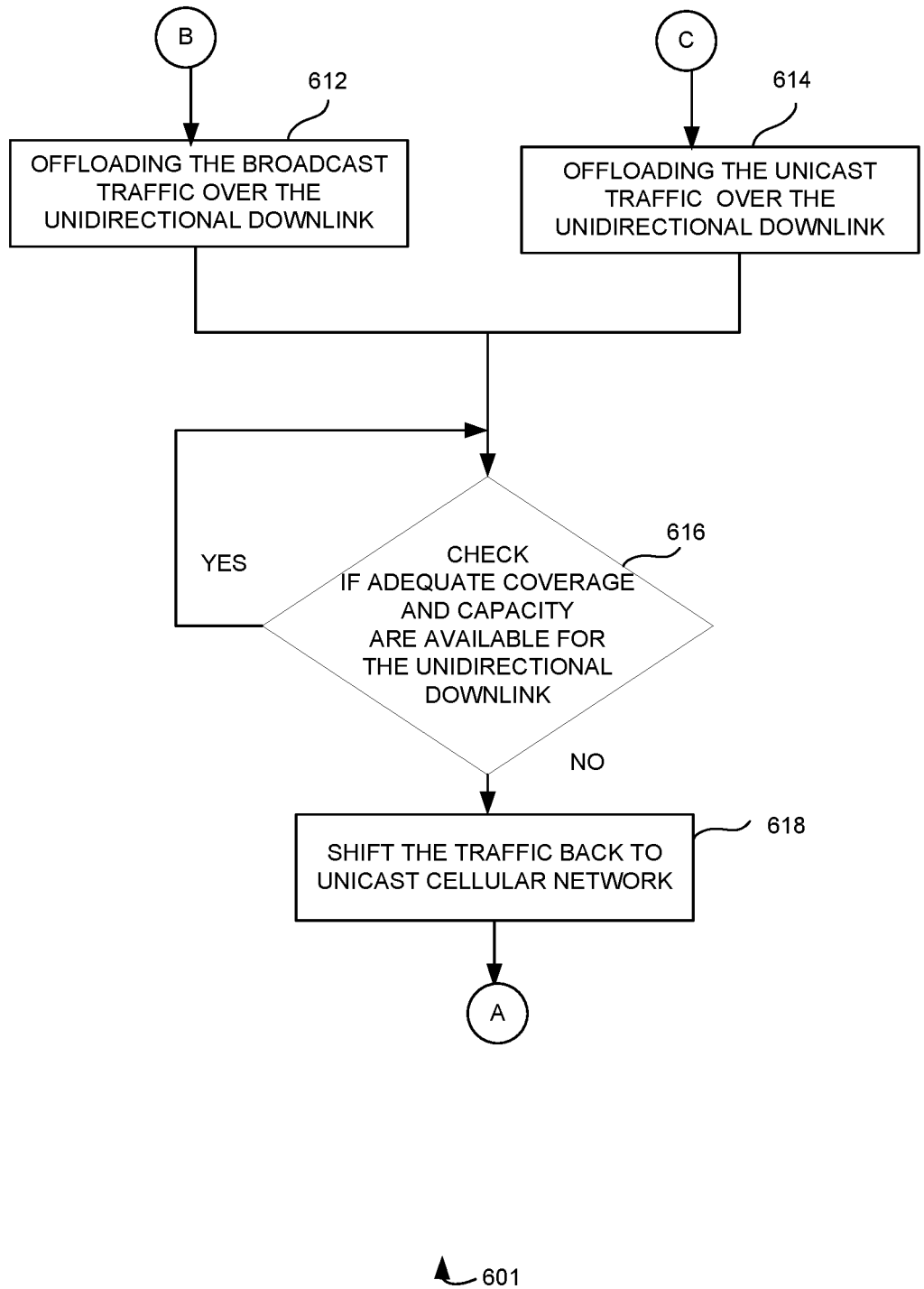

FIGS. 6A-6B are flow diagrams that illustrate a method of offloading at least one of (i) broadcast traffic or (ii) unicast traffic using the packet inspection and steering unit 108 of FIG. 1 according to some embodiments herein. At a step 602, the method 600 includes starting a process. At a step 604, the method 600 includes monitoring traffic streams, file transfers, and sessions using the packet inspection and steering unit 108 for identifying sessions potentially suitable for offload. In some embodiments, the same information can also be obtained by receiving notifications from at least one of (i) a content provider or (ii) the converged UE 120. At a step 606, the method 600 includes checking if common streams being consumed over unicast, if Yes goes to step 608 else goes to step 610. At a step 608, the method 600 includes checking if a set of converged UE's receiving the common streams is in a region has good broadcast coverage and adequate spare capacity exists in a broadcast pipe in the unidirectional downlink to accommodate the above-mentioned traffic stream, if Yes goes to step 612 else goes to step 604. At step 610, the method 600 includes checking if for the converged UE there are adequate coverage and spare capacity in the unidirectional downlink to provide supplementary downlink services for offloading unicast traffic if the adequate common streams are not identified at the step 606, if Yes goes to step 614 else goes to step 604. At a step 612, the method 601 includes offloading the broadcast traffic over the unidirectional downlink. At a step 614, the method 601 includes offloading the unicast traffic over the unidirectional downlink, while the uplink is continued in the unidirectional cellular network. By this method, the unidirectional downlink is used to provide supplementary downlink services.

If it is found that the traffic is not suitable for offload to the unidirectional downlink (based on steps 606, 608, and 610), the traffic continues to flow in unicast fashion in the cellular network, subject to monitoring (as in step 604).

In FIG. 6B of the method 601, for the traffic which has been offloaded to the unidirectional downlink from the cellular network using the method described by FIG. 6A, At step 614, the method 601 includes continuously checking if the converged UE 120 is still in a good coverage area of the broadcast region (in case of broadcast offload) or the unidirectional downlink still has adequate signal strength and capacity (for supplementary downlink), if Yes continue the process else goes to step 618. At step 618, the method 601 includes shifting the traffic back to unicast cellular network If these conditions are not true at the step 614.

Figure 7:
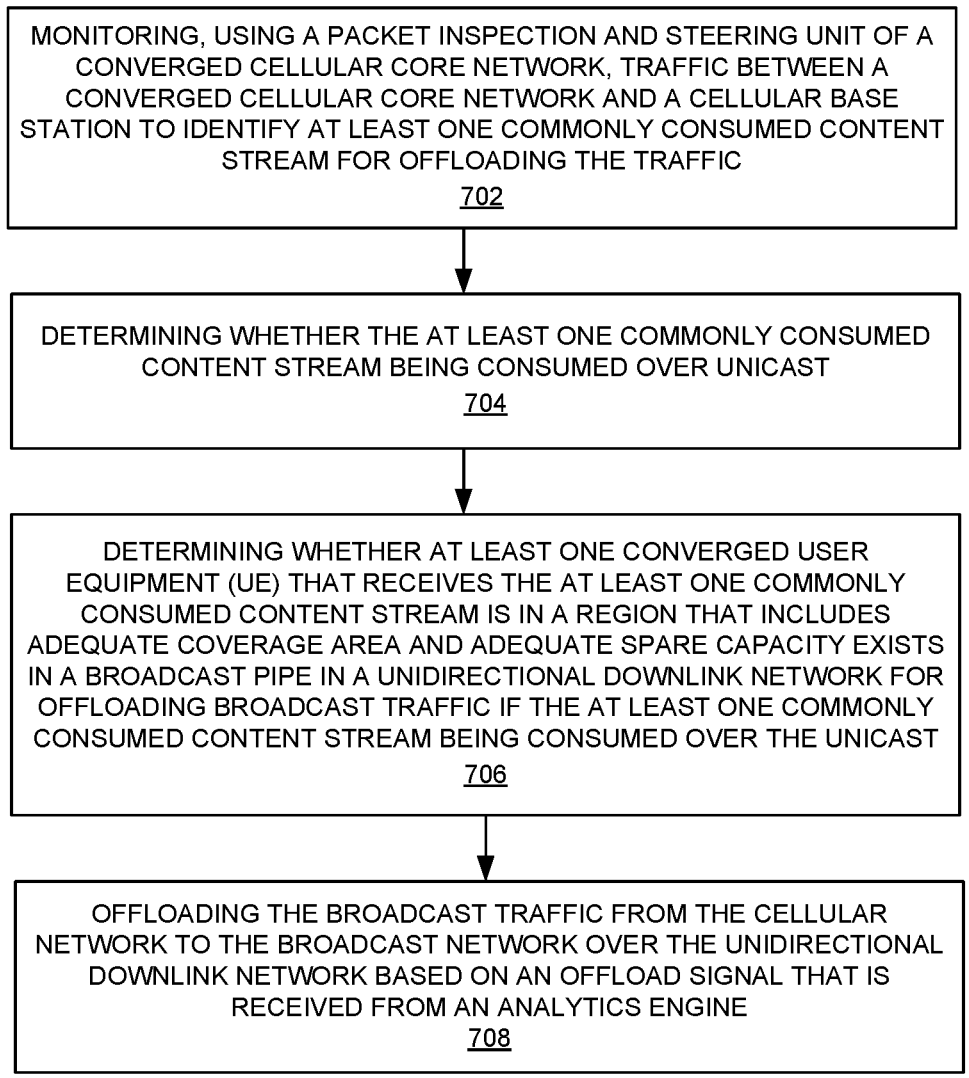
FIG. 7 is a flow diagram that illustrates a method for offloading traffic from a cellular network to a broadcast network according to some embodiments herein.

FIG. 7 is a flow diagram that illustrates a method 700 for offloading traffic from a cellular network to a broadcast network according to some embodiments herein. At a step 702, the method 700 includes monitoring, using the packet inspection and steering unit 108 of the converged cellular core network 102, the traffic between the converged cellular core network 102 and the cellular base station 116 to identify commonly consumed content streams for offloading the traffic. At a step 704, the method 700 includes determining, using the packet inspection and steering unit 108, whether the commonly consumed content streams being consumed over unicast. At a step 706, the method 700 includes determining, using the packet inspection and steering unit 108, whether the converged User Equipment (UE) 120 receives the commonly consumed content streams is in a region that includes adequate coverage area and adequate spare capacity exists in a broadcast pipe in a unidirectional downlink network for offloading broadcast traffic if the commonly consumed content streams being consumed over the unicast. At a step 708, the method 700 includes offloading, using the packet inspection and steering unit 108, the broadcast traffic from the cellular network to the broadcast network over the unidirectional downlink network based on an offload signal that is received from the analytics engine 210.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for offloading traffic from a cellular network to a broadcast network, said system comprising:
    a converged cellular core network that comprises a packet inspection and steering unit that
        monitors the traffic between the converged cellular core network and a cellular base station to identify at least one commonly consumed content stream for offloading the traffic;
        determines whether the at least one commonly consumed content stream being consumed over unicast;
        determines whether at least one converged User Equipment (UE) that receives the at least one commonly consumed content stream is in a region that comprises adequate coverage area and adequate spare capacity exists in a broadcast pipe in a unidirectional downlink network for offloading broadcast traffic if the at least one commonly consumed content stream being consumed over the unicast; and
        offloads the broadcast traffic from the cellular network to the broadcast network over the unidirectional downlink network based on an offload signal that is received from an analytics engine, wherein the analytics engine indicates the packet inspection and steering unit to offload the at least one commonly consumed content stream as a broadcast payload in the unidirectional downlink network by
            determining if the adequate coverage area and the adequate spare capacity in the region of interest are exists in the unidirectional downlink network; and
            determining if a number of UEs are consuming the at least one commonly consumed content stream within the adequate coverage area and the adequate spare capacity in the region of interest, thereby reducing an overall bandwidth required to transfer the at least one commonly consumed content stream to the number of UEs.

2. The system of claim 1, wherein the packet inspection and steering unit enables offloading a downlink part of unicast traffic to the unidirectional downlink network as a supplementary downlink service if the analytics engine determines that the number of UEs does not receive the at least one commonly consumed content stream, wherein the packet inspection and steering unit identifies sessions that can be offloaded for supporting offload of the traffic from the converged cellular core network to the broadcast network to offload the unicast traffic.

3. The system of claim 1, wherein the packet inspection and steering unit shifts the traffic back to the cellular network from the broadcast network, if the analytics engine determines that the adequate coverage area or the adequate spare capacity are not available for the unidirectional downlink network.

4. The system of claim 1, wherein the packet inspection and steering unit offloads the broadcast traffic from the cellular network to the broadcast network or the downlink part of the unicast traffic to the unidirectional downlink network as the supplementary downlink service based on rules that are stored in a Policy Rules Engine, wherein the Policy Rules Engine is implemented with the packet inspection and steering unit.

5. The system of claim 1, wherein the analytics engine is configured to gather traffic flow data from at least one of (i) the converged cellular core network, or (ii) the at least one converged user equipment (UE), wherein the analytics engine gathers the traffic flow data in the cellular network through at least one of (i) an "Element Management System (EMS)" or (ii) a "Self-Optimizing Network (SON)" and that is reported by the at least one converged user equipment (UE) and a load manager that monitors each traffic flow data through the load manager.

6. The system of claim 1, wherein the at least one converged UE comprises a location identifying module that reports a current location on the at least one converged UE, wherein the at least one converged UE determines the current location based on at least one of (i) cellular cell site information, (ii) Broadcast Radio Head identification indicators, (iii) Global Navigation Satellite System (GNSS) information and (iv) location information obtained from access points or beacons.

7. The system of claim 1, wherein the system comprises a converged RAN that comprises an ORAN based eNB/gNB, wherein the ORAN based eNB/gNB comprises a central unit, a distributed unit, and a radio unit.

8. A method for offloading traffic from a cellular network to a broadcast network, said method comprising:
    monitoring, using a packet inspection and steering unit of a converged cellular core network, the traffic between the converged cellular core network and a cellular base station to identify at least one commonly consumed content stream for offloading the traffic;

determining whether the at least one commonly consumed content stream being consumed over unicast;

determining whether at least one converged User Equipment (UE) that receives the at least one commonly consumed content stream is in a region that comprises adequate coverage area and adequate spare capacity exists in a broadcast pipe in a unidirectional downlink network for offloading broadcast traffic if the at least one commonly consumed content stream being consumed over the unicast; and offloading the broadcast traffic from the cellular network to the broadcast network over the unidirectional downlink network based on an offload signal that is received from an analytics engine, wherein the analytics engine indicates the packet inspection and steering unit to offload the at least one commonly consumed content stream as a broadcast payload in the unidirectional downlink network by determining if there are the adequate coverage area and the adequate spare capacity in the region of interest in the unidirectional downlink network; and determining if a number of UEs are consuming the at least one commonly consumed content stream within the adequate coverage area and the adequate spare capacity in the region of interest, thereby reducing an overall bandwidth required to transfer the at least one commonly consumed content stream to the number of UEs.

9. The method of claim 8, wherein the method comprises enabling, using the packet inspection and steering unit, offloading a downlink part of unicast traffic to the unidirectional downlink network as a supplementary downlink service if the analytics engine determines that the number of UEs does not receive the at least one commonly consumed content stream, wherein the packet inspection and steering unit identifies sessions that can be offloaded for supporting offload of the traffic from the converged cellular core network to the broadcast network to offload the unicast traffic.

10. The method of claim 8, wherein the method comprises shifting, using the packet inspection and steering unit, the traffic back to the cellular network from the broadcast network, if the analytics engine determines that the adequate coverage area or the adequate spare capacity are not available for the unidirectional downlink network.

11. The method of claim 8, wherein the packet inspection and steering unit offloads the broadcast traffic from the cellular network to the broadcast network or the downlink part of the unicast traffic to the unidirectional downlink network as the supplementary downlink service based on rules that are stored in a Policy Rules Engine, wherein the Policy Rules Engine is implemented with the packet inspection and steering unit.

* * * * *